US006826563B1

United States Patent
Chong et al.

(10) Patent No.: US 6,826,563 B1
(45) Date of Patent: Nov. 30, 2004

(54) SUPPORTING BITMAP INDEXES ON PRIMARY B+TREE LIKE STRUCTURES

(75) Inventors: Eugene I. Chong, Concord, MA (US); Jagannathan Srinivasan, Nashua, NH (US); Souripriya Das, Nashua, NH (US); Charles G. Freiwald, Amherst, NH (US); Aravind Yalamanchi, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 546 days.

(21) Appl. No.: 09/865,599

(22) Filed: May 29, 2001

(51) Int. Cl.⁷ ............................................. G06F 17/30
(52) U.S. Cl. ................................... 707/4; 707/3
(58) Field of Search ..................... 707/1, 2, 3, 4, 707/5, 6, 7, 8, 9, 10, 101, 102, 103; 341/95

(56) References Cited

U.S. PATENT DOCUMENTS

| 5,363,098 | A | | 11/1994 | Antoshenkov ............... 341/95 |
|---|---|---|---|---|
| 5,560,007 | A | * | 9/1996 | Thai .............................. 707/3 |
| 5,852,822 | A | | 12/1998 | Srinivasan et al. ............ 707/4 |
| 5,893,104 | A | | 4/1999 | Srinivasan et al. .......... 707/102 |
| 6,081,800 | A | * | 6/2000 | Ozbutun et al. ................ 707/3 |
| 6,266,660 | B1 | * | 7/2001 | Liu et al. ....................... 707/3 |
| 6,349,308 | B1 | * | 2/2002 | Whang et al. .......... 707/103 Z |

OTHER PUBLICATIONS

Spatial Quadtree Indexing, Oracle Spatial User's Guide and Reference for Oracle Release 8.1.6, Dec. 1999.

* cited by examiner

*Primary Examiner*—Diane D. Mizrahi
*Assistant Examiner*—Yicun Wu
(74) *Attorney, Agent, or Firm*—Swidler Berlin Shereff Friedman, LLP

(57) ABSTRACT

A method for building bitmap indexes on a primary B+tree used for storing data in the database that has a mapping table associated with it. The bitmap index is built by using the mapping table row identifiers.

37 Claims, 2 Drawing Sheets

US 6,826,563 B1

SUPPORTING BITMAP INDEXES ON PRIMARY B+TREE LIKE STRUCTURES

FIELD OF THE INVENTION

The present invention relates to organizing and accessing database indices. In particular, the present invention relates to a secondary index structure for indexing an index-organized table. More particularly, the present invention relates to a bitmap index for use with a primary B+tree structure. The present invention also relates to methods for creating a bitmap index for a primary B+tree structure.

BACKGROUND OF THE INVENTION

In a typical relational database system, users store, update, and retrieve information by interacting with user applications. The applications respond to a user's interaction by submitting commands to a database application, or server, responsible for maintaining the database. The database server responds to commands by performing the specified actions on the database. To be correctly processed, the commands must comply with the database language that the database server supports. One popular database language is known as Structured Query Language (SQL).

Various access methods may be utilized to retrieve data from a database. The access methods used to retrieve data may significantly affect the speed of the retrieval and the amount of resources consumed during the retrieval process. Many information retrieval applications make use of indices when performing content-based searches on the database data. Examples of database indices include R-trees, quadtrees, and B-trees.

Database indices provide organization and reference to the data in a database to permit a user to find particular items of data in the database or determine relationships among the data in the database. Database indices can also permit relationships between the data in a database and data not included in the database to be determined. For example, an index can make it possible to determine location within a certain distance of a location defined in a database comprised of geographical location information. Typically, such indices are implemented using a heap-organized table and a B-tree index.

SUMMARY OF THE INVENTION

The present invention provides a method for supporting bitmap indexes on a primary B+tree that has a mapping table associated with it. The mapping table includes primary key values from the primary B+tree. The bitmap index is built by using the row identifiers of the mapping table associated with the primary B+tree.

Furthermore, the present invention provides an alternate method for supporting bitmap indexes on a primary B+tree structure. The method includes maintaining a separate column for storing a sequence number in the primary B+tree and generating a secondary index on the separate column. The bitmap index is built by using the sequence numbers stored in the corresponding rows.

In addition to the above, the present invention provides a computer program product for performing a process of managing data in a database system. The computer program product includes a computer readable medium and computer program instructions recorded on the computer readable medium and executable by a processor. The instructions performing the steps of creating bitmap indexes on a primary B+tree that has a mapping table associated it by using the mapping table row identifiers.

Also, the present invention provides a system for performing a process of managing data in a database system. The system includes a processor operable to execute computer program instructions and a memory operable to store computer program instructions executable by the processor. The instructions perform the steps of creating bitmap indexes on a primary B+tree that includes an associated mapping table. The steps include building the bitmap indexes by using the mapping table row identifiers.

Still other objects and advantages of the present invention will become readily apparent ID by those skilled in the art from a review of the following detailed description. The detailed description shows and describes preferred embodiments of the invention, simply by way of illustration of the best mode contemplated of carrying out the present invention. As will be realized, the present invention is cap able of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

Bitmap indexes are useful for indexing low cardinality data as well as for indexing fact tables to speed up star queries that are very common in data warehousing environments. Bitmap index support for heap tables relies heavily on the fixed-length and well-known format of physical row identifiers. Because of these properties of physical row identifiers, a sequence of row identifiers corresponding to duplicate values for a given key, can be efficiently compressed and stored in a bitmap. Bit maps are described in detail in U.S. Pat. No. 5,363,098, for "Byte Aligned Data Compression", issued Nov. 8, 1994, to Antoshenkov, the entire contents of the disclosure of which are hereby incorporated by reference.

However for primary B+tree structures, directly using a leaf block address as physical row identifiers typically is not practical due to the volatility of the physical row identifiers. That is, rows move to maintain the sorted nature of primary B+tree structure. For primary B+-tree structures no prior solutions exist to support bitmap indexes. In fact, no prior solution exists for this problem.

Bitmap indexes play an important role in data warehousing applications. Since primary B+tree structures can be used as fact tables in data warehousing, bitmap index support typically is necessary. The present invention provides significant advantages over existing structures and methods. For example, without employing the present invention it is difficult or impossible to support bitmap indexes on primary B+tree structures.

According to the present invention, a mapping table is created for a primary B+tree structure. The mapping table may be created as described in a U.S. patent application Ser. No. filed on even date herewith for "Mapping Logical Row Identifiers For Primary B+Tree-Like Structures To Physical Row Identifiers", to Chong et al., having attorney docket number 19111.0038, the entire contents of the disclosures of both of which are hereby incorporated by reference. The bitmap index is built by using the row identifiers of the mapping table associated with the primary B+tree.

According to some embodiments, an alternate scheme for supporting bitmap indexes involves having a separate column in the primary B+tree that stores a sequence number and using the sequence number to build bitmap indexes. Such embodiments may also include a secondary index for the separate column.

According to some embodiments, during updating the primary key of the primary B+tree, the associated mapping table row is also modified. The modified mapping table row may be stored as a fragmented row. This aspect of this embodiment is discussed in greater detail below in the context of updating the primary keys of the primary B+tree structure.

Figure 1:
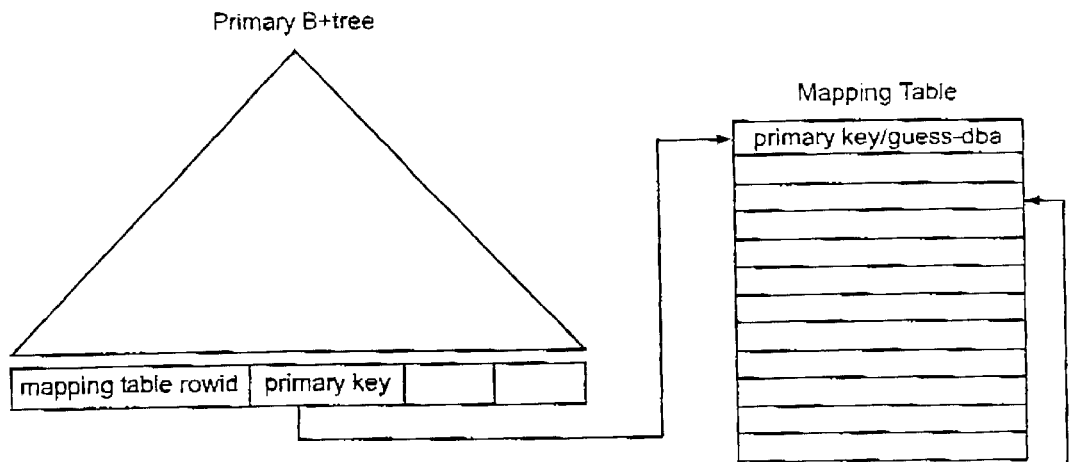
FIG. 1 represents a diagram of a primary B+tree structure and a mapping table according to an embodiment of the present invention.
Figure 2:
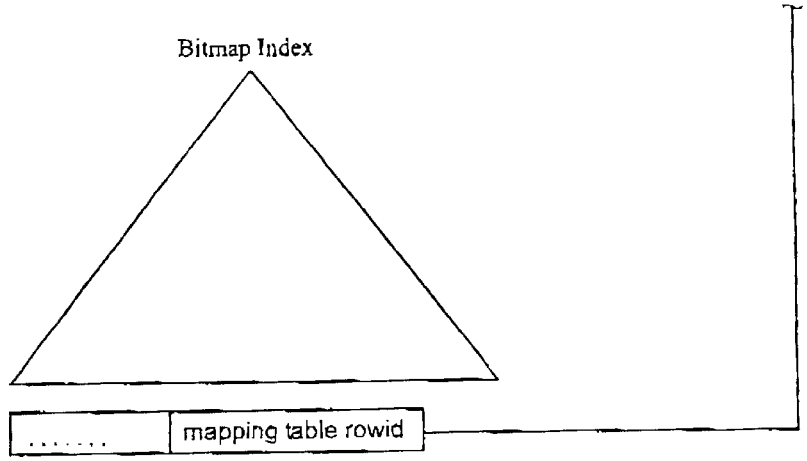
FIG. 2 represents an embodiment of a supporting bitmap index according to the present invention.

FIG. 1 provides a diagram that schematically illustrates the relationship between the B+tree and the mapping table or "heap". As shown in FIG. 1, the present invention can utilize the mapping table row identifier in the bitmap index row. With this configuration, existing compression techniques may be utilized used for bitmap index construction without modification.

The invention may utilize the primary B+tree and the mapping table as needed in carrying out queries. Along these lines, the present invention may operate from the mapping table to access the primary B+tree structure or in the opposite direction, utilizing the primary B+tree structure to access the mapping table. For example, in a "mapping table only" scan, a query may only require bitmap index columns and primary key columns.

According to the patent application for "Mapping Logical Row Identifiers For Primary B+Tree-Like Structures To Physical Row Identifiers", to Chong et al., referred to above, the mapping table may store guess-database block address (DBA) values and primary key values for the primary B+tree structure. According to some embodiments, the present invention can use the mapping table row content <guess-DBA, primary key> to obtain base table row for queries involving bitmap index columns and needing other columns that are neither bitmap index key columns nor primary key columns. A query performed in such a manner may first utilize the guess. If the guess is invalid, such as, for example, when the primary key does not match, then the method may fall back to a primary key based traversal.

The present invention also includes accounting for mapping table access in determining to bitmap index usage for queries. Along these lines, the present invention can include maintaining guess quality statistic. The guess quality statistic can include a ratio of correct guess-DBA for the mapping table and using it in generation of plans that involve bitmap index. The guess quality is implicitly collected if the primary B+tree structure has a mapping table. This is described in greater detail in U.S. patent application Ser. No. 09/473,073, to Chong et al., filed Dec. 28, 1999, for "Database System Having Logical Row Identifiers", the entire contents of the disclosure of which is hereby incorporated by reference.

Given the guess quality P, and N, the number of rows fetched, the cost formula for accessing the primary B+tree structure from the mapping table may be defined as follows:

$$P*N+(1-P)*N*(L+1)=N+N*L*(1-P),$$

where L is the height of the primary B+tree structure. If this cost is smaller than the primary key based traversal, the guess-DBA is used first to access the primary B+tree structure.

In addition to the above, the present invention also contemplates utilizing a mapping table row identifier stored in the primary B+-tree structure to perform a corresponding update on the bitmap index when bitmap index columns are updated. This can avoid adding additional indexing structures for efficient lookup of mapping table rows or in absence of such structures, resorting to full-scan of the mapping table for such lookup. In utilizing the mapping table, the bitmap index returns mapping table row identifier which can be used to directly access the mapping table row thus obviating need for index lookup. Also, the bitmap index infrastructure may be utilized as it is without requiring any changes. Furthermore, logical row identifiers need to be stored.

With respect to updating primary keys, according to some embodiments, the present invention translates the primary key updates to in-place updates on corresponding mapping table rows, rather than deleting the current row followed by insertion of a new row. Thereby, the present invention can retain the same mapping table row identifier thus avoiding any update to corresponding bitmap index entries. When update causes mapping table row to expand beyond the amount of space available at the current location, the present invention may store the modified row as a fragmented, or chained, row, thereby avoiding change to the mapping table row identifier.

Although reuse of sequence numbers, if sequence numbers are used, when rows are deleted may be difficult because keeping track of sequence numbers for deleted rows can require maintaining a list of deleted sequence numbers, which can become arbitrarily large. According to the present invention, ROWIDs of deleted rows may be reused implicitly when a new row is inserted into the deleted slot.

Figure 3:
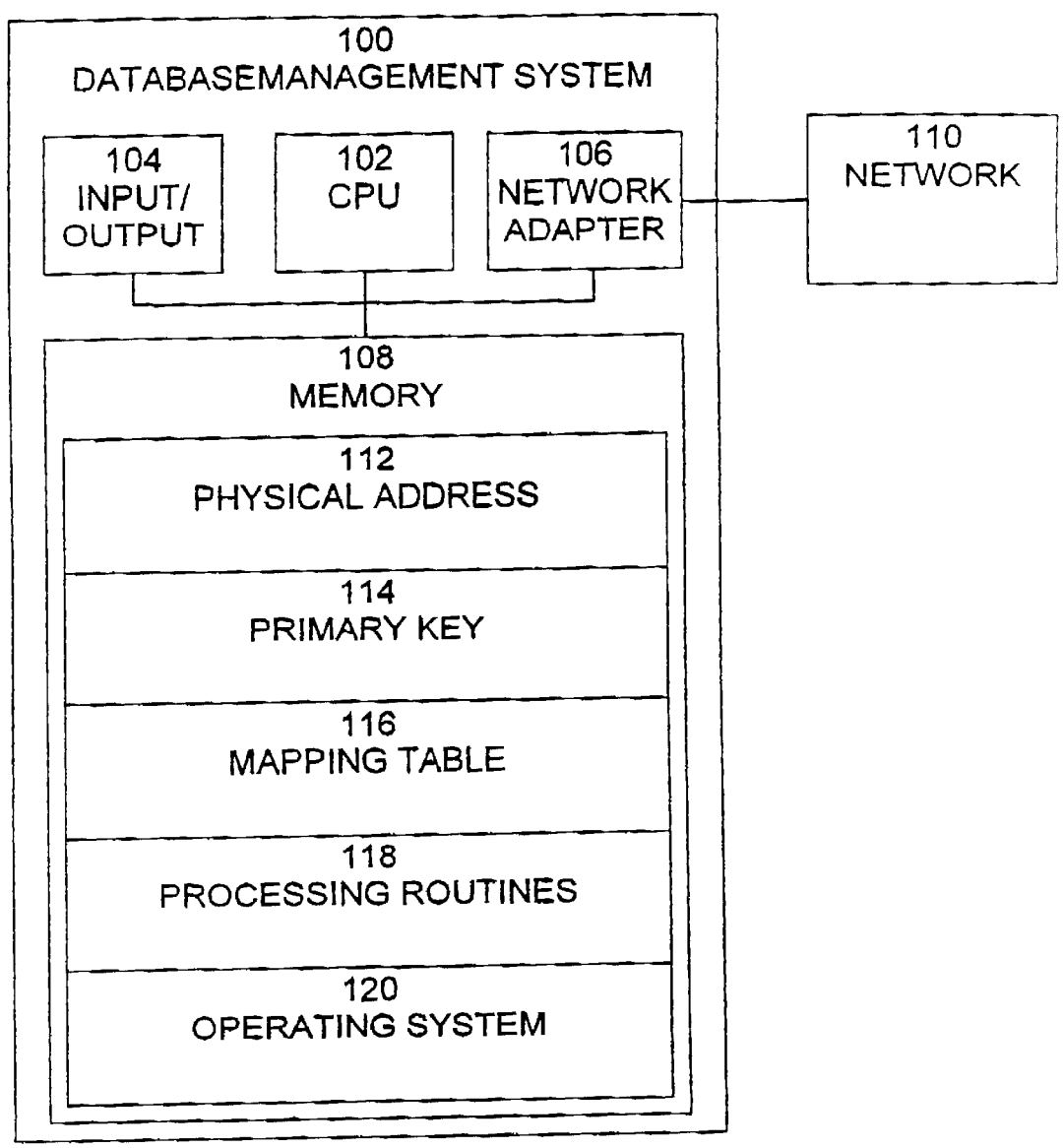
FIG. 3 represents a block diagram that illustrates an embodiment of a database management system according to the present invention.

An exemplary block diagram of an embodiment of a database management system 100, according to the present invention, is shown in FIG. 3. Database management system, such as the embodiment shown in FIG. 3, is typically a programmed general-purpose computer system, such as a personal computer, workstation, server system, and minicomputer or mainframe computer. Database management system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor.

Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces database management system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as randomaccess memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as primary physical address block 112, primary key block 114, and mapping table block 116, and a plurality of blocks of, program instructions, such as processing routines 118 and operating system 120. Physical address block 112 stores physical addresses of the primary B+tree structure utilized in the database management system 100. Primary key block 114 stores a plurality of primary keys that may be useful in structures and methods according to the present invention. Mapping 'table block 116 stores the bitmap index representing the mapping table according to the present invention. Processing routines 118 are software routines that implement the processing performed by the present invention. Along these lines, processing routines perform the methods of the present invention as described above in greater detail. Operating system 120 provides overall functionality to the system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A database management system, comprising:
   a primary B+tree for storing data in the database;
   a mapping table associated with the primary B+tree;
   a bitmap index built using the row identifiers of the mapping table associated with the primary B+tree;
   wherein the database management system is operable to carry out a query requiring a bitmap index column and at least one additional column other than a bitmap index key column or a primary key column by utilizing mapping table row content, wherein the mapping table row comprises guess-database block address and primary key; and
   utilize primary key based traversal if the primary key does not match the guess-database address.

2. The database management system according to claim 1, wherein the mapping table stores guess-database addresses and primary key-values for the primary B+tree.

3. The database management system according to claim 1, further comprising:
   a guess quality statistic comprising a ratio of valid guess-database addresses to total rows for the mapping table.

4. The database management system according to claim 1, further comprising:
   a separate column in the primary B+tree, wherein the separate column stores a sequence number; and
   a secondary index for the separate column and the bitmap index built using the sequence numbers stored in the rows of the primary B+tree.

5. A method for managing data stored in a database, the method comprising:
   creating a primary B+tree to store the data and populate the mapping table;
   creating a bitmap index for the primary B+tree by using row identifiers of the mapping table;
   carrying out a query requiring a bitmap index column and at least one additional column other than a bitmap index key column or a primary key column by utilizing mapping table row content, wherein the mapping table row comprises guess-database block address and primary key; and
   utilizing primary key based traversal if the primary key does not match the guess-database address.

6. The method according to claim 5, further comprising:
   carrying out a database query requiring bitmap index columns and primary key columns by scanning only the bitmap index and the mapping table.

7. The method according to claim 5, further comprising: accounting for mapping table access in determining bitmap index usage for queries.

8. The method according to claim 7, wherein accounting for mapping table access comprises:
   maintaining a guess quality statistic comprising a ratio valid of guess-database block address to total number of rows for the mapping table; and
   utilizing the statistic in generation of plans involving the bitmap index.

9. The method according to claim 8, further comprising:
   collecting the guess quality if the primary B+tree has a mapping table.

10. The method according to claim 8, further comprising:
    calculating a cost for accessing the primary B+tree structure according to the following formula:

$$P*N+(1-P)*N*(L+1)=N+N*L*(1-P)$$

wherein L is the height of the primary B+tree structure, P is the guess quality and N is the number of rows fetched;
   comparing the cost of accessing the primary B+tree structure to the cost of traversing the primary B+tree structure; and
   utilizing the guess-DBA first if the cost of accessing the primary B+tree structure is smaller than the cost of traversing the primary B+tree.

11. The method according to claim 5, further comprising:
updating the bitmap index columns;
updating the bitmap index utilizing the mapping table row identifier stored in the primary B+tree structure.

12. The method according to claim 5, further comprising: translating updates on primary keys to in-place updates on a corresponding mapping table row.

13. The method according to claim 5, further comprising:
retaining a same mapping table row identifier and avoiding updating a corresponding bitmap index entry by translating updates on primary keys to in-place updates on a corresponding mapping table row.

14. The method according to claim 5, further comprising:
storing a modified row as a fragmented row when updating the primary keys of the B+tree structure causes a mapping table row to expand beyond an amount of space available at a location of the mapping table row.

15. The method according to claim 5, further comprising:
maintaining a separate column for storing a sequence number; and
generating a secondary index on the separate column.

16. A computer program product for performing a process of managing data in a database system, the computer program product comprising:
a computer readable medium; and
computer program instructions, recorded on the computer readable medium, executable by a processor, for performing the steps of;
creating a primary B+tree to store the data that has a mapping table associated with it;
building a bitmap index utilizing mapping table row identifiers;
carrying out a query requiring a bitmap index column and at least one additional column other than a bitmap index key column or a primary key column by utilizing mapping table row content, wherein the mapping table row comprises guess-database block address and primary key; and
utilizing primary key based traversal if the primary key does not match the guess-database address.

17. A system for performing a process of managing data in a database system, the system comprising:
a processor operable to execute computer program instructions; and
a memory operable to store computer program instructions executable by the processor, for performing the steps of:
creating a primary B+tree to store the data that has a mapping table associated with it;
building a bitmap index utilizing mapping table row identifiers;
out a query requiring a bitmap index column and at least one additional column other than a bitmap index key column or a primary key column by utilizing mapping table row content, wherein the mapping table row comprises guess-database block address and primary key; and
utilizing primary key based traversal if the primary key does not match the guess-database address.

18. The computer program product according to claim 16, further comprising:
carrying out a database query requiring bitmap index columns and primary key columns by scanning only the bitmap index and the mapping table.

19. The computer program product according to claim 16, further comprising:
accounting for mapping table access in determining bitmap index usage for queries.

20. The computer program product according to claim 19, wherein accounting for mapping table access comprises:
maintaining a guess quality statistic comprising a ratio valid of guess-database block address to total number of rows for the mapping table; and
utilizing the statistic in generation of plans involving the bitmap index.

21. The computer program product according to claim 20, further comprising:
collecting the guess quality if the primary B+tree has a mapping table.

22. The computer program product according to claim 20, further comprising:
calculating a cost for accessing the primary B+tree structure according to the following formula:

$$P*N+(1-P)*N*(L+1)=N+N*L*(1-P)$$

wherein L is the height of the primary B+tree'structure, P is the guess quality and N is the number of rows fetched;
comparing the cost of accessing the primary B+tree structure to the cost of traversing the primary B+tree structure; and
utilizing the guess-DBA first if the cost of accessing the primary B+tree structure is smaller than the cost of traversing the primary B+tree.

23. The computer program product according to claim 16, further comprising:
updating the bitmap index columns;
updating the bitmap index utilizing the mapping table row identifier stored in the primary B+tree structure.

24. The computer program product according to claim 16, further comprising:
translating updates on primary keys to in-place updates on a corresponding mapping table row.

25. The computer program product according to claim 16, further comprising:
retaining a same mapping table row identifier and avoiding updating a corresponding bitmap index entry by translating updates on primary keys to in-place updates on a corresponding mapping table row.

26. The computer program product according to claim 16, further comprising:
storing a modified row as a fragmented row when updating the primary keys of the B+tree structure causes a mapping table row to expand beyond an amount of space available at a location of the mapping table row.

27. The computer program product according to claim 16, further comprising:
maintaining a separate column for storing a sequence number; and generating a secondary index on the separate column.

28. The system according to claim 17, further comprising:
carrying out a database query requiring bitmap index columns and primary key columns by scanning only the bitmap index and the mapping table.

29. The system according to claim 17, further comprising:
accounting for mapping table access in determining bitmap index usage for queries.

30. The system according to claim 29, wherein accounting for mapping table access comprises:

maintaining a guess quality statistic comprising a ratio valid of guess-database block address to total number of rows for the mapping table; and utilizing the statistic in generation of plans involving the bitmap index.

31. The system according to claim 30, further comprising:

collecting the guess quality if the primary B+tree has a mapping table.

32. The system according to claim 30, further comprising:

calculating a cost for accessing the primary B+tree structure according to the following formula:

$$P*N+(1-P)*N*(L+1)=N+N*L*(1-P)$$

wherein L is the height of the primary B+tree structure, P is the guess quality and N is the number of rows fetched;

comparing the cost of accessing the primary B+tree structure to the cost of traversing the primary B+tree structure; and utilizing the guess-DBA first if the cost of accessing the primary B+tree structure is smaller than the cost of traversing the primary B+tree.

33. The system according to claim 17, further comprising:

updating the bitmap index columns;

updating the bitmap index utilizing the mapping table row identifier stored in the primary B+tree structure.

34. The system according to claim 17, further comprising:

translating updates on primary keys to in-place updates on a corresponding mapping table row.

35. The system according to claim 17, further comprising:

retaining a same mapping table row identifier and avoiding updating a corresponding bitmap index entry by translating updates on primary keys to in-place updates on a corresponding mapping table row.

36. The system according to claim 17, further comprising:

storing a modified row as a fragmented row when updating the primary keys of the B+tree structure causes a mapping table row to expand beyond an amount of space available at a location of the mapping table row.

37. The system according to claim 17, further comprising:

maintaining a separate column for storing a sequence number; and generating a secondary index on the separate column.

* * * * *